United States Patent
Hagen

[19]
[11] Patent Number: 5,973,884
[45] Date of Patent: Oct. 26, 1999

[54] GIMBAL ASSEMBLY WITH OFFSET SLIDER PAD AND CROSS BEAM FOR PITCH AND ROLL STIFFNESS AND HIGH VERTICAL AND HORIZONTAL STIFFNESS

[75] Inventor: Tracy M. Hagen, Edina, Minn.

[73] Assignee: K. R. Precision Public Company Limited, Ayutthaya, Thailand

[21] Appl. No.: 08/897,409

[22] Filed: Jul. 21, 1997

[51] Int. Cl.[6] ..................... G11B 5/48
[52] U.S. Cl. ........................ 360/104
[58] Field of Search ............. 360/104

[56] References Cited

U.S. PATENT DOCUMENTS

| | | | |
|---|---|---|---|
| H1425 | 4/1995 | Wolter | 360/104 |
| 4,167,765 | 9/1979 | Watrous | 360/103 |
| 5,138,507 | 8/1992 | Zarouri | 360/104 |
| 5,299,081 | 3/1994 | Hatch | 360/104 |
| 5,568,332 | 10/1996 | Khan | 360/104 |
| 5,602,699 | 2/1997 | Khan | 360/104 |
| 5,696,652 | 12/1997 | Satoh | 360/104 |
| 5,825,589 | 10/1998 | Khan | 360/104 |

*Primary Examiner*—A. J. Heinz
*Attorney, Agent, or Firm*—Antonio R. Durando

[57] ABSTRACT

A new gimbal for a disk drive head assembly includes a weld plate, a pair of compliant beams, a lateral beam, and a slider supporting surface. The gimbal also encompasses a cross beam that links the pair of compliant beams, thereby enhancing the transverse stiffness of the gimbal. In the preferred embodiment the cross beam is also provided with a cantilever tab to enhance the vertical stiffness of the gimbal. An S-shaped bend may be provided normal to the centerline of the gimbal to offset the plane of the slider supporting surface from the main gimbal. In addition, the gimbal may be provided with a formed edge along the outer length of the lateral beam to reduce the danger of damaged transducer wires. Finally, the gimbal may be combined with a carrier strip that eliminates the need for a large tooling hole within the weld plate of the gimbal.

25 Claims, 4 Drawing Sheets

GIMBAL ASSEMBLY WITH OFFSET SLIDER PAD AND CROSS BEAM FOR PITCH AND ROLL STIFFNESS AND HIGH VERTICAL AND HORIZONTAL STIFFNESS

BACKGROUND OF THE INVENTION

1. Field of the Invention

This invention is related to the general field of direct access computer disk drives used for storing computer data on rigid magnetic disks. In particular, the invention pertains to a gimbal used in a head assembly of a disk drive.

2. Description of the Related Art

The magnetic recording head of a rigid disk drive operates by flying in very close proximity over the surface of a magnetic disk, thereby accurately reading and writing data thereon. While the magnetic recording head, referred in the art as the "slider," is flying disposed substantially in parallel over the disk during operation, it must be able to adjust its attitude to conform to magnetic-disk surface imperfections and dynamic displacements, such as surface vibrations generated by the rotating movement. Therefore, the torsional characteristics of the flexure assembly supporting the slider are critical to the proper functioning of the apparatus and must be maintained within prescribed design specifications to prevent contact with the disk surface and avoid the disabling consequences that normally result therefrom.

As well understood in the art, the flexure assembly used in a conventional disk drive head assembly generally includes a gimbal, a load beam and a mounting plate. The gimbal is affixed to the slider, which contains an electromagnetic transducer for recording and retrieving information from the spinning magnetic disk. The slider is provided with a self-acting hydrodynamic air bearing that allows the slider to fly in close proximity to the disk, thereby improving the performance of the electromagnetic transducer. The gimbal is designed to provide compliance in the directions of the slider's pitch and roll axes, thereby allowing the slider to freely follow the topography of the magnetic disk. On the other hand, the gimbal is also designed to be non-compliant, or rigid, in the yaw, off-track (generally the direction transverse to the gimbal), and on-track directions, thereby ensuring that the electromagnetic transducer is maintained in precise alignment with the data track of the magnetic disk. In order to reduce cost, the gimbal is normally fabricated as a single discrete piece of metal foil, usually 304-series stainless steel, full-hard temper.

The load beam is affixed to the gimbal and the mounting plate and provides a precise spring force that counteracts the lifting force generated by the slider's air bearing, thereby ensuring that the flying height of the slider above the disk is maintained at the desired design target. The load beam must be compliant in the vertical or out-of-plane direction, so as to allow the slider to follow freely the topography of the disk. At the same time, the load beam is intended to be rigid in the horizontal or in-plane direction, thereby ensuring that the electromagnetic transducer is maintained in precise alignment with the data track of the magnetic disk.

The mounting plate, which is affixed to the load beam, is a robust and rigid structure through which the flexure assembly can be secured to a test fixture, to tooling equipment, or to a head positioning device in a consistent and predictive manner that will not impart damage to the relatively more delicate load beam. Of these three components, the gimbal presents the most significant design challenges to ensure the intended performance of a computer head assembly.

Figure 1:
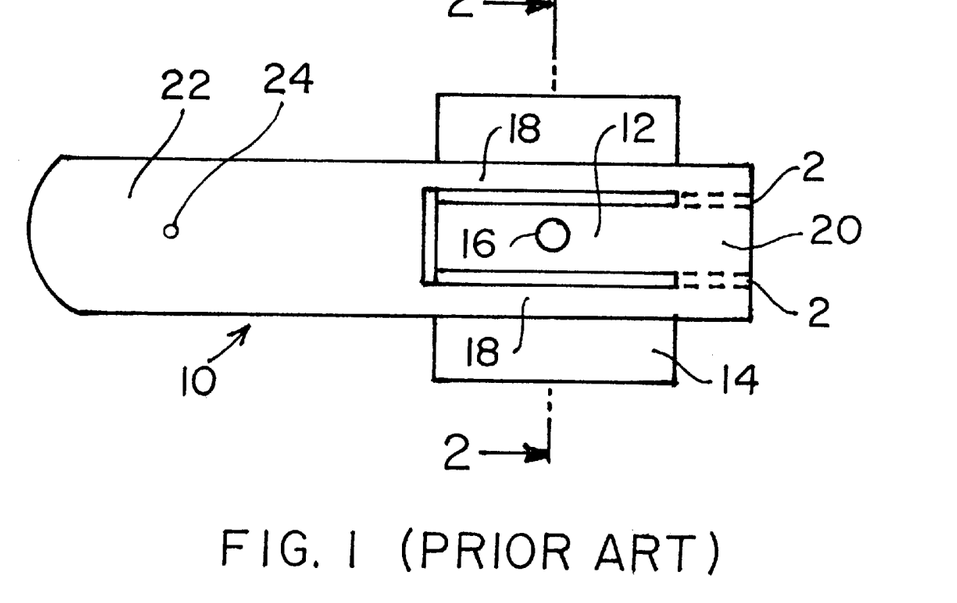
FIG. 1 is a plan view of a conventional prior-art gimbal intended for use with a load beam and an air-bearing slider in a disk drive head assembly.
Figure 2:
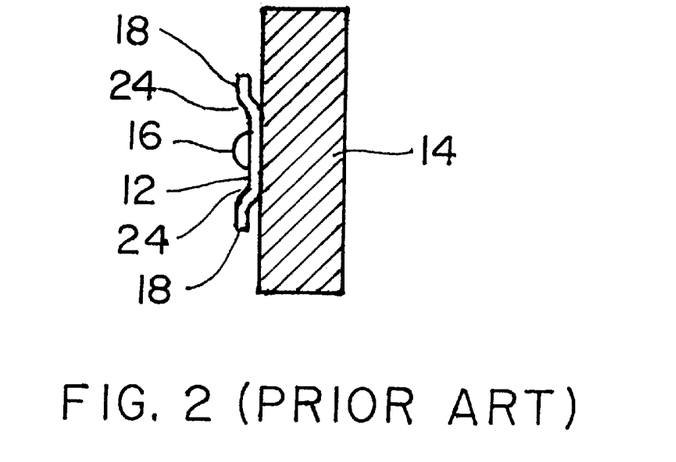
FIG. 2 is a sectional view of the gimbal of FIG. 1 taken along line 2—2 in that figure.

A conventional discrete gimbal 10 for a disk drive head assembly, such as described in U.S. Pat. No. 4,167,765 (Watrous), is illustrated in FIGS. 1 and 2. This head assembly encompasses several identifiable features. One is a slider supporting pad 12, which is coated with adhesive during the head assembly manufacturing process and secures the slider 14 to the gimbal. The supporting pad tends to be in the shape of a cantilever tab; thus, it is often referred to as "the tongue." Another feature is a load-point protrusion 16, which is semi-spherical in shape and located somewhere on the slider supporting pad. The load-point protrusion 16 allows for the load force from the load beam to be transmitted to the slider in a manner that does not inhibit movement of the slider in the pitch and roll directions. The load-point protrusion is often referred to as "the dimple."

The patented gimbal 10 includes a gimbal beam 18 disposed on each side of the slider supporting pad 12. The gimbal beams 18 are designed to be flexible in the out-of-plane direction to impart the desired pitch and roll compliance to the gimbal, while being rigid in the in-plane directions to impart the desired yaw and in-plane rigidity. An additional, lateral beam 20 connects the distal ends of the two gimbal beams 18 to the slider supporting pad 12. The lateral beam 20 is normally stamped out-of plane to offset the slider supporting pad away from the gimbal beams by an amount approximately equal to the height of the dimple 16, and to locate the slider supporting pad 12 in a particular angular position that will impart desired fly-height characteristics to the slider 14. The lateral beam 20 is often referred to as the "step form area."

A weld plate 22 connects the proximate ends of the two gimbal beams 18 and is laser welded to the load beam. The weld plate region normally has a circular tooling hole 24 adapted to engage a pin in a fixture used to align the gimbal to the load beam during laser welding. Typically, this tooling hole is about 0.800 mm (0.315 inches) in diameter.

The prior art comprises several other gimbal designs developed to fit particular applications and equipment, mostly based on variations of the Watrous patent. In spite of these improvements, the features of the gimbals used in modern flexure assemblies are problematic in a number of ways. The first problem arises from the requirement that the gimbal be compliant in the pitch and roll directions, and yet rigid in the yaw and in-plane directions. If the gimbal beams 18 are made longer, the pitch and roll compliance is improved but the yaw and in-plane stiffness is degraded. Likewise, if the gimbal is made from a thinner foil, or the width of each gimbal beam is decreased, the pitch and roll compliance is improved but the yaw and in-plane stiffness is reduced. Similarly, if the spacing between the gimbal beams is reduced, the roll compliance is improved but the yaw and in-plane stiffness is degraded. Thus, the design of gimbal beams based on the features of the Watrous patent necessarily represents a compromise between these competing characteristics.

Another problem with the patented gimbal is that its out-of-plane compliance can lead to slider air bearing damage during manufacture of the disk drive as a result of careless handling of the head positioning actuator device prior to installation into the disk drive. When the head positioning actuator device is being prepared for installation, the heads are kept out of contact with each other by using a comb-like tooling fixture with a plurality of fingers that deflect the load beams and separate the sliders. However, shock and vibrations produced by careless handling can result in a slider contacting an adjacent slider and damaging either or both sliders' air bearing surfaces, and possibly also the gimbals. Thus, the out-of-plane stiffness of the gimbal must be low for compliance in pitch and roll, yet it must be high enough to prevent excursions of the slider into another slider during moments of careless handling of the head positioning device.

Yet another problem with the gimbal 10 of the prior art is the step-forming construction of the lateral beam. Such forming unavoidably draws material out-of-plane, which results in the ends of the gimbal beams being drawn towards each other. Since the gimbal beams 18 are designed to have a high resistance to bending in-plane, the step-form operation leaves the gimbal in a state of high stress due to the tendency of the gimbal beams to return to their natural state. These high stresses tend to concentrate at the bend points 26 of the step form because of the relatively sharp radius of curvature at the bend points, and because of the reduction in material thickness of the gimbal at the bend points 26 caused by the forming step. Thus, cracking can take place in this region, often from fatigue when the gimbal is vibrated at very high frequency in an ultra-sonic cleaning system.

An additional common problem with conventional gimbals is the large size of the weld plate region 22. This introduces additional and undesirable mass to the flexure assembly. Furthermore, the large weld plate size is problematic when an existing gimbal design is to be used with a load beam that has been reduced in size for use with smaller sliders and disk drives. In such cases the gimbal will tend to be too large to fit onto the load beam, which then leads to undesirable compromises in the design of the load beam.

One more problem with conventional gimbals is the inclusion of the tooling alignment hole 24 in the weld plate region 22. The load beam has a corresponding tooling alignment hole. These holes are created by chemical machining (acid etching) of a foil sheet using well known industry processes and are held to very strict tolerances. During welding of the gimbal to the load beam, it is not uncommon for the etched edges of such holes to be in contact with the pins of the weld alignment fixture, which leads to pin wear caused by a scraping action when the flexures are removed from the weld fixture. When significant pin wear occurs, the through-hole diameter in the welded assembly may be significantly less than the original diameter of the gimbal tooling hole 24, or of the load beam tooling alignment hole. This condition can lead to an interference fit of the flexure assembly on subsequent tooling and fixturing pins, rendering the flexure assembly unfit for manufacturing even though the misalignment of the gimbal to the load beam may not be sufficient to render the flexure unfit for use, thereby creating unnecessary waste.

Still another problem with conventional gimbals is the way the slider supporting pad 12 causes distortion of the slider's air bearing surface. Because the stainless steel of the gimbal has a thermal coefficient of linear expansion different from that of the slider, changes in temperature produce unequal amounts of expansion (or contraction) in the gimbal and the slider, which leads to strain and distortion in both. The adhesive layer placed between the slider bonding pad and the slider is normally very thin in order to ensure coplanarity between the gimbal tongue and the backside of the slider; thus, a significant amount of thermally-induced stress and strain is transmitted between the slider and the gimbal. The resulting distortion of the air bearing surface can cause up to as much as a one-for-one change in the flying height of the slider, which results in the transducer being located too far from the disk and degrading the transducer's output, or in the slider flying too close to the disk thereby increasing the likelihood of catastrophic head-disk interaction.

One approach to reducing thermally-induced stress and strain is to decrease the area of the slider supporting pad 12. However, to ensure the manufacture of a well-formed load point protrusion 16, a sufficient area for clamping around the load point protrusion is required; thus, reducing this area can result in poorer quality of forming of the load point protrusion. Furthermore, it is desirable for the plane of the slider supporting pad to be flat and well defined to improve the predictability of the slider pitch and roll static attitude with respect to a given datum (e.g., the "flat" region in the rigid section of the load beam, or the mounting surface of the head assembly). Reducing the area of the slider supporting pad leads to flatness control problems because it is more difficult to clamp and hold the pad flat during load point protrusion forming.

Another problem with the slider supporting pad 12 disclosed in U.S. Pat. No. 4,167,765 is that its peripheral edges are located an exceedingly short distance from the inside edges of the two gimbal beams 18. If too much adhesive is applied by a head assembly production operator, the adhesive may squeeze out from under the slider supporting pad and bridge to one or both gimbal beams. This causes the gimbal to seize; that is, the gimbal can no longer freely move in pitch and roll, and the head assembly must be scrapped.

Still another problem with the slider supporting pad 12 is that the head assembly must be inspected during manufacture for insufficient adhesive (as well as for the excessive adhesive condition previously described). Inspection for adhesive fillets around the perimeter of the slider supporting pad is made difficult by the close proximity of the gimbal beams 18, the slider 14, and the load beam. This restricts the lines of sight to the slider supporting pad edges, and also reduces the amount of light that reaches this area to aid in the inspection.

In addition, the process of bonding a slider to a supporting pad of the type described in the prior art requires squeezing the adhesive between them to form very thin bondlines. The resulting thin and spread-out layer of adhesive restricts the utility of ultraviolet (UV) light curable adhesives, which are desirable for their quick cure times, because UV light is incapable of penetrating thin and broad adhesive films.

One more problem with the slider supporting pad 12 of the Watrous gimbal is that the adhesive-bond length in the transverse direction of the gimbal is substantially less than the width of the slider or the gimbal. The length of adhesive in this direction has a direct bearing on the strength of the bond between the slider and the gimbal.

Finally, another problem is the fact that the entire peripheral edge of conventional gimbals is extremely sharp due to the use of chemical machining to create the part and the nature of stainless steel. Since the electrical signals from the transducer are transmitted through soft and delicate copper wires that unavoidably must be routed across the edges of the gimbal, their sharpness can produce damaged wires that cause rejections during the manufacture of head assemblies.

Therefore, there is still a need for an improved gimbal design that addresses the problems associated with prior-art devices. The present invention is directed to a novel gimbal configuration that materially reduces these problems and enhances overall performance.

BRIEF SUMMARY OF THE INVENTION

An object of this invention is to provide a gimbal with low pitch and roll stiffnesses and with exceptionally high in-plane stiffness, in particular in the off-track direction (generally the transverse direction of the gimbal).

It is also an object of the invention to provide a gimbal with low pitch and roll stiffnesses and with exceptionally high vertical, or out-of-plane, stiffness.

Another objective of the invention is a gimbal with a low state of stress after forming.

Still another object of the invention is to provide a gimbal with a weld plate of reduced length and mass.

It is also a goal of the invention to provide a gimbal and a related carrier-strip design where the tooling hole used to align the gimbal to tooling and fixtures during component fabrication is removed from the gimbal after the gimbal has been welded to the load beam.

Yet another object of the invention is a gimbal with an adhesive application region that does not require squeezing of the adhesive into an excessively thin film and that, therefore, does not allow for the adhesive to easily contact other parts of the gimbal and render the head assembly unfit for use. Instead, a goal of the invention is to provide an adhesive application region across the entire transverse width of the gimbal, and having a well exposed periphery for visual inspection and for UV light curing of the slider-to-gimbal bonding layer.

Finally, an objective of this invention is to provide a gimbal fabricated in such a manner that sharp edges are eliminated along the section where the wires from the slider's transducer cross over the gimbal structure.

Therefore, according to these and other objectives, the present invention consists of a novel gimbal configuration intended for use with a load beam and an air-bearing slider in a disk drive head assembly. As in the case of prior-art devices, the entire gimbal structure is symmetrical about its longitudinal axis. According to one aspect of the invention, the gimbal has a substantially U-shaped cutout defining a slider supporting surface projecting backwards from the distal end of the gimbal, and correspondingly defining the inside edges of two gimbal beams and the forward edge of a cross beam. The slider supporting surface is offset from and positioned substantially parallel to the major plane of the gimbal by a step formed transversely in the area where the supporting surface protrudes from the lateral beam connecting the two gimbal beams in the distal end of the gimbal.

According to another aspect of the invention, an outer edge is formed in the lateral beam substantially normal to the major plane of the gimbal and disposed transversely in parallel to the step formed between the gimbal and the supporting surface.

According to yet another aspect of the invention, a substantially V-shaped cutout in the gimbal structure further defines the inside edges of the two gimbal beams and the edges of a supplemental leaf spring projecting backwards from the cross beam towards the weld plate area. The weld plate area preferably contains a sizable perforation between the proximal ends of the gimbal beams and a weld plate beam that constitutes the proximal end of the gimbal.

According to another aspect of the invention, the weld plate beam of the gimbal is attached to a carrier strip that contains the tooling hole required for precise fixturing of the gimbal during component fabrication. The carrier strip is cut away from the gimbal after laser welding of the gimbal to the load beam.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose only one of the various ways in which the invention may be practiced.

DESCRIPTION OF THE PREFERRED EMBODIMENT OF THE INVENTION

The main inventive concepts of this disclosure consist of the generally U-shaped and V-shaped cutouts in the structure of the gimbal, the raised edge of the lateral beam at the proximal end of the gimbal, and the removable carrier strip that contains the tooling hole required for precise fixturing of the gimbal during component fabrication. In combination, these features produce a much improved gimbal structure that overcomes may of the problems still present in prior-art devices.

Figure 3:
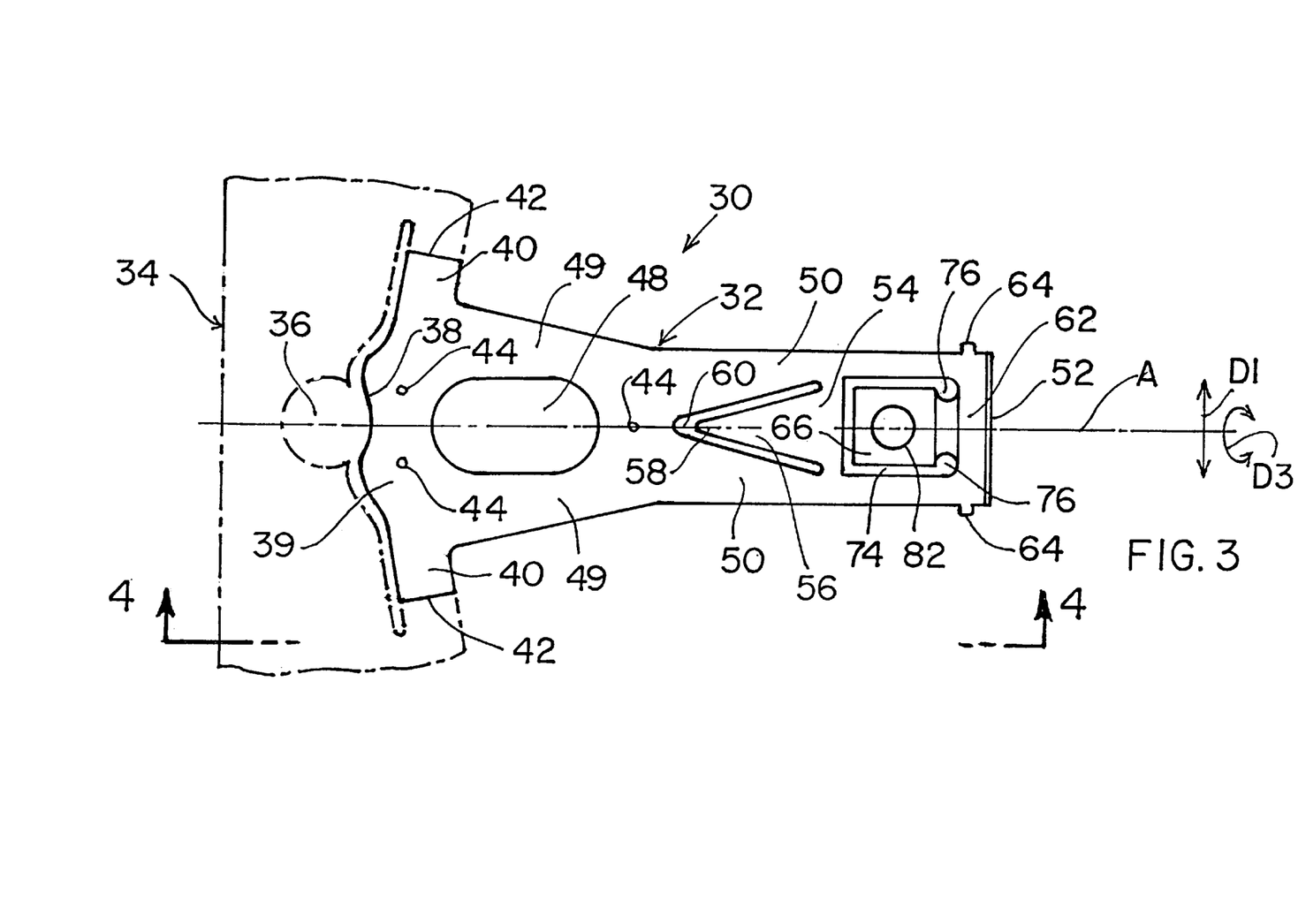
FIG. 3 is a plan view of a gimbal according to the preferred embodiment of the present invention.
Figure 4:
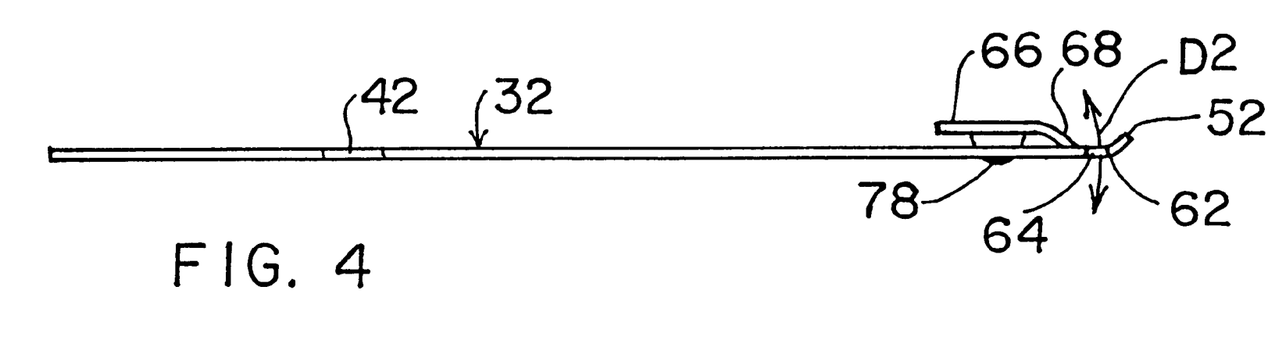
FIG. 4 is a side view of the gimbal of FIG. 3 taken along line 4—4 in that figure.
Figure 5:
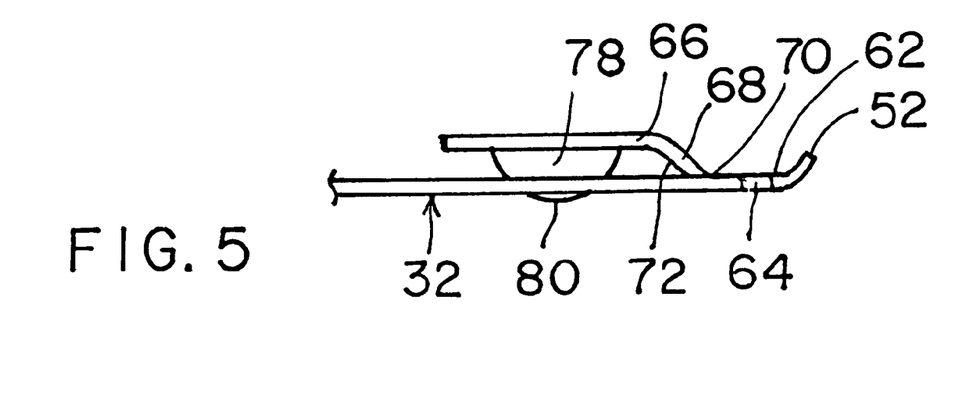
FIG. 5 is an enlarged view of a portion of FIG. 4 to illustrate in detail the offset between the tongue and the main structure of the gimbal of the invention.

Referring to the drawings, wherein like parts are designated throughout with like numerals and symbols, FIGS. 3–5 illustrate a gimbal structure 30 according to the preferred embodiment of the invention. In particular, the device illustrated in the drawings is a gimbal design to be used with a "nano" form factor slider having dimensions of 2.00× 1.60×0.43 millimeters. As in the case of prior-art gimbals, though, one familiar with the art of gimbal design would appreciate that the gimbal of the invention can be scaled up or down in length, and/or width, and/or thickness, to accommodate other slider sizes.

The entire gimbal is made integrally from 304-series full hard stainless steel, preferably 0.030 mm thick, and is manufactured using well-known chemical machining processes. As shown in the drawings, the structure 30 comprises an actual gimbal portion 32, illustrated in solid line; and a segment of carrier strip 34, illustrated in a broken, dot-dash line. The carrier strip 34 is fabricated from the same parent sheet of stainless steel foil and contains a plurality of gimbals. The use of a carrier strip to fabricate gimbals is well-known.

The carrier strip 34 contains a hole 36 (having a diameter of about 0.800 mm in the preferred embodiment) centered along the structure's main axis A and adjacent to the proximal end 38 of the gimbal 32. Approximately one-sixth of the hole's perimeter is defined by the proximal edge of the weld plate beam 39, the rest being delimited by the carrier strip. Projecting away from the hole 36 and the weld plate beam 39 in a direction approximately normal to the longitudinal axis A of the gimbal are two tabs 40 defined on one side by a cutout between the gimbal 32 and the carrier strip 34. In the preferred embodiment of the invention the cutout is about 0.100-mm wide and the tabs 40 are about 0.50-mm wide. After welding the gimbal 32, while supported by the carrier strip, to a load beam (not shown), each tab 40 is cut to a shorter lateral dimension (for example, 0.40 mm from the axis A) along the path identified by numeral 42 in the FIG. 3 in order to free the gimbal 32 from the carrier strip 34, thereby also freeing the tooling hole 36 from the gimbal. Preferably, the gimbal is laser welded to a load beam in three locations. Two welds at weld points 44 are located about 0.700 mm from the center of the 0.800-mm diameter tooling hole 36, and about 0.400 mm from the longitudinal axis A of the gimbal structure 30. A third weld point 44 is located on the gimbal's axis A about 2.900 mm from the center of the tooling hole 36.

The relationship between the gimbal 32, the gimbal carrier strip 34, and the tooling hole 36 of the invention results in a gimbal of reduced length, terminating at a point approximately tangent to the corresponding tooling hole in the load beam (not seen in the figures). In addition, inasmuch as the edge of the gimbal 32 is tangent to the tooling hole 36 over a circumferential length of approximately only one-sixth that of the total circumference, after attachment to the load beam the tooling hole in the flexure assembly is defined almost entirely by the tooling hole in the load beam. This significantly reduces the likelihood of obtaining undersized tooling holes in the resulting flexure assemblies.

As those skilled in the art readily understand, the region generally containing the three weld points 44 constitutes the weld plate 46 of the gimbal 32 of the invention. The structure of the weld plate 46 is integral with the tabs 40 and contains an opening 48 substantially centrally located within the weld plate. The opening 48 is preferably oblong and disposed symmetrically within the weld plate 46, and is provided to reduce the mass of the weld plate region and to serve as a receiver for an alignment pin to register head-gimbal assemblies to each other during assembly of the head positioning actuator. Thus, the opening 48 defines two support members 49 projecting forward from the tabs 40 symmetrically and substantially in parallel to the longitudinal axis A of the gimbal 32. The overall width of the gimbal 32 decreases along members 49 with increased distance from the tabs 40 to a point of minimum width corresponding approximately to the location of the third weld point 44 in the figure. Proceeding forward from about that point, each member 49 is connected to a gimbal beam 50 that projects forward to the gimbal's distal end 52. Preferably, the overall width of the gimbal beams 50 (i.e., the distance from the outside edge of one gimbal beam to the outside edge of the other gimbal beam) is constant along the length of the gimbal beams.

Located approximately midway in the gimbal beams 50 is a cross beam 54, which connects the two gimbal beams to create a very wide single beam system when the gimbal 32 is deflected in the off-track direction (i.e., the in-plane direction illustrated by arrow D1 normal to the gimbal longitudinal centerline, or main axis A), thereby significantly increasing the stiffness of the gimbal in the off-track direction. However, the cross beam 54 does not significantly detract from the performance of the two gimbal beams in pitch or roll deflections (illustrated in FIGS. 3 and 4 by arrows D2 and D3, respectively), thereby allowing the stiffness in these directions to remain favorably low.

Projecting away from the cross beam 54, disposed between the two gimbal beams 50 and pointing towards the weld plate area 46 is a cantilever tab 56. The addition of the cantilever tab 56 serves to further increase the rigidity of the cross beam 54 in the direction D1 of off-track deflection, thereby increasing the off-track stiffness of the gimbal 32.

In addition, the cantilever tab 56 provides an even more significant contribution to the gimbal by increasing its stiffness in out-of-plane directions when subjected to loads that are primarily translational. Such load vectors are often created by careless handling of a head positioning actuator device. If such load vectors are sufficiently high, the inertia of the slider will create a force capable of pulling the gimbal out-of-plane. Thus, there is a possibility for the slider to collide violently with an adjacent slider, thereby damaging the air bearing surface of either or both sliders, as well as damaging the gimbal 32. In order to prevent this effect in the flexure of the invention, the distal end 58 of the cantilever tab 56 is deflected into the supporting load beam during shock and vibration events that cause the slider to pull the gimbal 32 out of plane. The cantilever beam 56 then behaves as a leaf spring, thereby providing the gimbal 32 with additional out-of-plane stiffness. The cutout 60 between the two gimbal beams 50 and the cantilever tab 56 is preferably in the shape of a V, although one familiar with the design of gimbals could easily change it to other, equivalent forms providing the same benefits.

A lateral beam 62 is integral with or affixed to the distal ends of the two gimbal beams 50 normal to the longitudinal axis A of the gimbal, and defines the very end of the gimbal structure. Preferably, each end of the lateral beam 62 is provided with a connection tab 64 attaching the gimbal to the carrier strip 34 during gimbal manufacturing. Providing a second pair of connection tabs (the first pair being the ends of the tabs 40) significantly improves the stability of the gimbal as the carrier strip 34 is processed through high-speed forming dies, where the gimbal and carrier strip are subjected to abrupt stop-start motions.

An additional feature of the preferred embodiment of the invention is an upward bend formed in the outside, distal edge 52 of the lateral beam 62 in a direction substantially normal to the plane of the gimbal (see the enlarged, detailed side view of FIG. 5). When such a form is provided on the gimbal 32 of the invention, the etched edge 52 of the lateral beam 62 is positioned such that it cannot contact the wires running to the electromagnetic transducer on the slider, thus eliminating this significant cause of wire damage.

A slider supporting pad 66 is integral with or attached to the inside, proximal edge of the lateral beam 62. In the preferred embodiment, the transition region between the lateral beam 62 and the slider supporting pad 66 includes a substantially S-shaped bend 68 placing the slider supporting pad 66 above and largely parallel with the plane of the gimbal 32. As one familiar with the design of head assemblies would readily understand, there are instances when the slider supporting pad 66 must be capable of placement in a non-parallel attitude with respect to the gimbal 32 (for pitch and roll purposes). In such instances the angle between the slider supporting pad and the gimbal is typically of the order of about one degree. The S-shape bend 68 of the invention includes two bends around axes transverse to the gimbal's main axis A. A first bend 70 is formed with a center of curvature positioned above the plane of the gimbal (FIG. 5), while the other bend 72 is formed with a center of curvature below the gimbal. It is clear that this method of forming a step bend does not cause the gimbal beams 50 to be drawn in towards the center of the gimbal 32, thereby avoiding the shortcomings of prior-art designs. As a result of this method of construction, no residual stress and strain are retained in the gimbal beams 50 or in the formed bends 70,72, thereby leaving the gimbal 32 in a low state of stress.

The slider supporting pad 66 is substantially square in shape, although other shapes could be easily realized for particular slider geometries. The cutout 74 defining the slider supporting pad 66 from the two gimbal beams 50 and the cross beam 54 is preferably U-shaped with a flat bottom, although equivalent designs could easily be implemented by one skilled in the art to change it from a flat-bottom-U to some other form, and yet allow the gimbal to be manufactured and operate in a manner substantially the same as the preferred embodiment. In order to further reduce stresses, an area 76 with an enlarged radius should be provided at each end of the U-shaped cutout 74 because these areas are prone to suffer concentration of high levels of stress when the gimbal 32 is subject to high external forces and loads.

Approximately at the center of the slider supporting pad 66 is a semi-spherical formed load point protrusion or dimple 78 in the direction of the plane of the gimbal. Preferably, the apex 80 (FIG. 5) of the load point protrusion 78 is located past the plane of the gimbal 32; that is, on the side of the gimbal opposite that of the slider supporting pad 66. Such an arrangement ensures that the load point protrusion 78 will be in contact with the load beam after the gimbal 32 is welded to it, a necessity for the proper operation of the gimbal. The amount of extension of the load point protrusion 78 beyond the gimbal structure is typically 30 to 40 microns.

During the manufacturing process, the gimbal 32 of the invention is formed from a thin sheet of flat stainless steel, preferably using a multiple cavity forming die. While many variations in forming die design are readily possible, the salient point of any preferred design is to always complete the S-shaped bend 68 forming prior to the forming of the dimple 78. Otherwise, if the dimple is formed prior to the S-shaped bend, it is possible that during the forming of the bend the dimple's location along the longitudinal centerline of the gimbal could shift slightly in the direction of the S-shaped bend. This concern is not present when the dimple is formed after the S-shaped bend forming operation.

Modifications to the gimbal design of the invention could readily be made by those skilled in the art of gimbal design and manufacture in order to improve gimbal formability and control. For example, a narrow cutout could be etched into the gimbal at the point where material is to be formed. The cutout would serve as an alignment perforation to encourage forming at an exact point on the gimbal.

Figure 6:
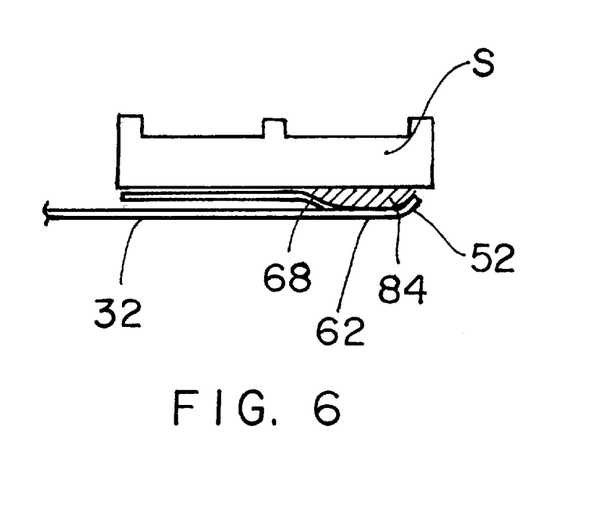
FIG. 6 is another view of the detail of FIG. 5 to illustrate the preferred method of attachment of a slider to the gimbal of the invention.

In prior-art gimbal designs, adhesive is applied in the cavity 82 (FIG. 3) of the load point protrusion 78, and then evenly and sparingly spread over the slider supporting pad 66. While this process could also be employed with the gimbal of the invention, the preferred method is to apply the slider bonding adhesive on the lateral beam 62. Specifically, as illustrated in FIG. 6, a layer 84 of adhesive is applied to the slider S between the S-shape bend 68 on the inside, proximal edge of the lateral beam 62 and the upward bend on the outside, distal edge 52 of the lateral beam. Adhesive is applied at least out to where the lateral beam 62 transitions into the gimbal beams 50. In the preferred embodiment, no adhesive whatsoever is applied on the slider supporting pad 66, or in the cavity 82 of the load point protrusion 78.

Applying adhesive as described results in adhesive bondlines typically 0.075-mm thick, more than ten times the typical thickness of adhesive bondlines in prior-art gimbals where adhesive is applied in the area of the slider supporting pad. This significant increase in adhesive thickness greatly improves the ability of the adhesive to act as a stress-buffer between the gimbal and the slider when these components attempt to expand or contract with changes in temperature. Moreover, the increased thickness of the adhesive bondline in the inventive gimbal provides a significant improvement in the ability of UV light to penetrate into the bondline, thereby improving the cure of the adhesive during manufacture.

It is noted that the location of the slider bonding adhesive according to the invention is the distal end of the gimbal, rather than toward its center, thereby significantly improving an assembly operator's ability to inspect the adhesive joint for quality control. This feature also minimizes the number of directions to sensitive areas of the head assembly where adhesive can undesirably squeeze into during processing, leading to defective and unreliable head assemblies. It is also apparent that the gimbal of the invention makes it possible to apply adhesive across the entire width of the gimbal, thus significantly increasing the tensile and peel-pull strength between the slider and the gimbal.

Figure 7:
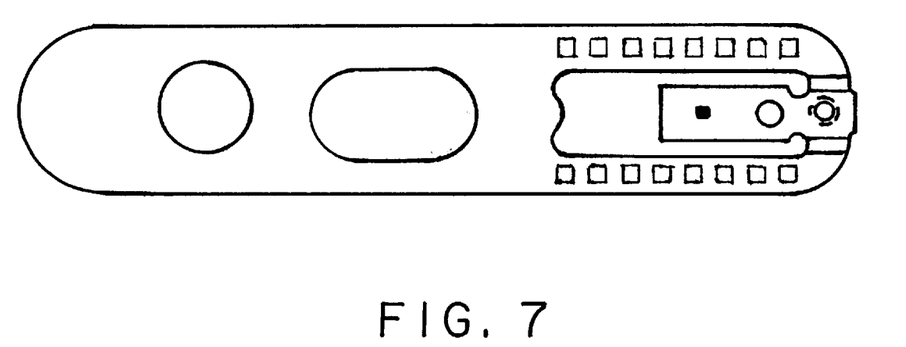
FIG. 7 is a plan view of a prior-art LSF gimbal.

The significant improvements provided by the present invention over prior-art gimbals were confirmed by computer finite-element models. A type of gimbal widely known in the disk-drive industry as the "Laterally Stiff Flexure," or LSF, is typical of prior-art gimbals. Such a gimbal is illustrated in FIG. 7. Accordingly, the gimbal 32 of the invention was modeled in three different configurations to quantify the contributions of the cross beam 54 and the cantilever tab 56 and compared to an LSF gimbal. The first configuration included no cross beam; the second configuration included a cross beam, but no cantilever tab; and the third configuration included a cross beam with a cantilever tab. The results from the computer finite-element model analysis are tabulated below:

| Parameter | LSF | Config 1 | Config 2 | Config 3 |
|---|---|---|---|---|
| $k_{Pitch}$ | 2.42 | 1.85 | 1.87 | 1.93 |
| $k_{roll}$ | 2.61 | 2.48 | 2.79 | 2.85 |
| $k_{off-track}$ | 11.37 | 16.88 | 24.01 | 25.57 |
| $k_{vertical}$ | 51.10 | 90.30 | 91.40 | 102.70 | where:

$k_{pitch}$ is gimbal pitch stiffness in $\mu$N-m/deg;

$k_{roll}$ is gimbal roll stiffness in $\mu$N-m/deg;

$k_{off-track}$ is gimbal off-track stiffness in N/mm; and $k_{vertical}$ is gimbal vertical stiffness in N/mm.

Clearly the gimbal of the invention provides significant improvements with respect to pitch stiffness, off-track stiffness, and vertical stiffness, although it is slightly unfavorable with respect to roll stiffness. However, the percent reduction in pitch stiffness is more than twice that of the percent increase in roll stiffness. Thus, from an overall perspective the inventive gimbal represents a significant improvement over prior-art gimbals, such as the LSF gimbal used for comparison.

An additional benefit of the gimbal of the invention is a reduction in the sensitivity of the pitch angle of the slider supporting pad 66 (pitch tongue angle) as a result of deflections in the load point protrusion 78. As described above, the gimbal 32 is manufactured such that the load point protrusion 78 will be in an interference fit condition with the load beam after manufacture. This ensures a positive contact between the tip 80 of the load point protrusion and the load beam, which is desirable from a functional perspective. However, variations in the deflection of the load point protrusion usually lead to changes in the pitch angle of the slider supporting pad 66, which is undesirable. Therefore, it is preferable to have a low sensitivity of the pitch tongue angle to variations in the load point protrusion deflection, so that minimal variations in pitch tongue angle are produced.

The gimbal of the invention demonstrated improved characteristics in this regard as well, as illustrated by the finite element analysis of the LSF gimbal and the three aforementioned gimbal configurations. The table below shows the sensitivities of the four different gimbals in units of degrees of pitch angle change per millimeter of load point protrusion deflection.

| Parameter | LSF | Config 1 | Config 2 | Config 3 |
|---|---|---|---|---|
| $\theta_{pitch}$ Sens. | 33.9 | 32.4 | 31.9 | 22.4 |

In summary, the gimbal of the invention demonstrated improved stiffness properties, an improved region for adhesive application, a reduced length, a reduced danger for wire damage, and an improved state of stress after forming, thereby improving the gimbal's overall performance in a computer disk drive.

Only the preferred embodiment has been described for purposes of this disclosure, but one familiar with the art of gimbal design and/or manufacture would easily recognize obvious changes that could be made to produce equivalent embodiments retaining the unique properties of the invention. Such changes could include, without limitation, variations in the proportions of element dimensions, variations in material thickness or material type, relocation or inversion of the load point protrusion from the gimbal to the load beam, and adoption of different methods of manufacture (e.g., stamping in place of chemical machining). Therefore, while the present invention has been shown and described herein in what is believed to be the most practical and preferred embodiment, it is recognized that departures can be made therefrom within the scope of the invention, which is not to be limited to the details disclosed herein but is to be accorded the full scope of the claims so as to embrace any and all equivalent processes and products.

I claim:

1. A gimbal for a slider for magnetic recording, wherein the slider is supported by a hydrodynamic air bearing generated by a relative motion between the slider and a rotating magnetic disk, said gimbal comprising:

a weld plate surface for attachment of the gimbal to a load beam supporting arm;

a pair of compliant gimbal beams having proximal ends connected to the weld plate surface, said gimbal beams being placed symmetrically and substantially parallel to a longitudinal centerline of the gimbal and defining longitudinal outer edges of the gimbal;

a lateral beam connected to distal ends of the gimbal beams, said lateral beam being substantially normal to the longitudinal centerline of the gimbal;

a slider supporting surface placed between the gimbal beams and connected to the lateral beam through a transition zone; and a cross beam connecting the gimbal beams at a position between the proximal and distal ends thereof, the cross beam being a structure substantially separate from the weld plate surface and substantially normal to the longitudinal centerline of the gimbal, an d the cross beam having a single locus of connection to each gimbal beam;

wherein said cross beam comprises a cantilever tab protruding toward the proximal ends of the compliant gimbal beams.

2. A gimbal as claimed in claim 1, wherein said cross beam is located substantially near the mid-point distance between the proximal and distal ends of the compliant gimbal beams.

3. A gimbal as claimed in claim 1, wherein each end of a cutout separating said gimbal beams from said slider supporting surface comprises an enlarged opening adjacent to said transition zone.

4. A gimbal as claimed in claim 1, wherein said cantilever tab includes an end substantially in longitudinal alignment with the proximal end of said compliant gimbal beams.

5. A gimbal as claimed in claim 1, wherein said transition zone contains an approximately S-shaped bend substantially normal to the longitudinal centerline of the gimbal producing an offset between the slider supporting surface and the gimbal.

6. A gimbal as claimed in claim 5, wherein said S-shaped bend in the transition zone consists of two bends having centers of curvature positioned on opposite sides of the gimbal.

7. A gimbal as claimed in claim 5, wherein a distal edge of said lateral beam is curved out-of-plane with respect to the gimbal on the same side of the gimbal as said approximately S-shaped bend.

8. A gimbal as claimed in claim 7, wherein said distal edge has a height approximately equal to said offset between the slider supporting surface and the gimbal.

9. A gimbal as claimed in claim 1, wherein a distal edge of said lateral beam is curved out-of-plane with respect to the gimbal.

10. A gimbal as claimed in claim 9, wherein said distal edge of the lateral beam is curved substantially normal to the gimbal.

11. A gimbal as claimed in claim 1, further comprising a pair of connection tabs integral with said lateral beam and distally connecting the gimbal to a carrier strip structure.

12. A gimbal as claimed in claim 1, further comprising a pair of attachment tabs integral with said weld plate surface and proximally connecting the gimbal to a carrier strip structure, and comprising a tooling alignment hole at least partially located in the carrier strip structure for engagement of a corresponding tooling hole in a load beam.

13. A gimbal as claimed in claim 12, further comprising a pair of connection tabs integral with said lateral beam and distally connecting the gimbal to a carrier strip structure.

14. A gimbal as claimed in claim 1, wherein said weld plate surface includes a perforation.

15. A gimbal as claimed in claim 1, wherein said cross beam comprises a cantilever tab protruding toward the proximal ends of the compliant gimbal beams; said transition zone contains an approximately S-shaped bend substantially normal to the longitudinal centerline of the gimbal producing an offset between the slider supporting surface and the gimbal; and a distal edge of said lateral beam is curved out-of-plane with respect to the gimbal.

16. A gimbal as claimed in claim 15, wherein said cross beam is located substantially near the mid-point distance between the proximal and distal ends of the compliant gimbal beams; said cantilever tab includes an end substantially in longitudinal alignment with the proximal end of said compliant gimbal beams; said S-shaped bend in the transition zone consists of two bends having centers of curvature positioned on opposite sides of the gimbal; said distal edge of the lateral beam is curved substantially normal to the gimbal, on the same side of the gimbal as said approximately S-shaped bend, and has a height approximately equal to said offset between the slider supporting surface and the gimbal;

said weld plate surface includes a perforation; and each end of a cutout separating said gimbal beams from said slider supporting surface comprises an enlarged opening adjacent to said transition zone.

17. A gimbal as claimed in claim 16, further comprising a pair of attachment tabs integral with said weld plate surface and proximally connecting the gimbal to a carrier strip structure, and comprising a tooling alignment hole at least partially located in the carrier strip structure for engagement of a corresponding tooling hole in a load beam.

18. A gimbal as claimed in claim 17, further comprising a pair of connection tabs integral with said lateral beam and distally connecting the gimbal to a carrier strip structure.

19. A gimbal for a slider for magnetic recording, wherein the slider is supported by a hydrodynamic air bearing generated by a relative motion between the slider and a rotating magnetic disk, said gimbal comprising:

a weld plate surface for attachment of the gimbal to a load beam supporting arm;

a pair of compliant gimbal beams having proximal ends connected to the weld plate surface, said gimbal beams being placed symmetrically and substantially parallel to a longitudinal centerline of the gimbal;

a lateral beam connected to distal ends of the gimbal beams, said lateral beam being substantially normal to the longitudinal centerline of the gimbal; and a slider supporting surface placed between the gimbal beams and connected to the lateral beam through a transition zone;

wherein said lateral beam is substantially coplanar with the gimbal beams and a distal edge of the lateral beam is curved out-of-plane with respect to the lateral beam.

20. A gimbal as claimed in claim 19, wherein said distal edge of the lateral beam is curved substantially normal to the gimbal.

21. A gimbal as claimed in claim 19, wherein said transition zone contains an approximately S-shaped bend substantially normal to the longitudinal centerline of the gimbal producing an offset between the slider supporting surface and the gimbal.

22. A gimbal as claimed in claim 21, wherein said distal edge of said lateral beam is curved out-of-plane with respect to the gimbal on the same side of the gimbal as said approximately S- shaped bend.

23. A gimbal as claimed in claim 22, wherein said distal edge has a height approximately equal to said offset between the slider supporting surface and the gimbal.

24. A carrier-strip gimbal assembly for fabrication of head assemblies for disk drives, comprising:

(a) a plurality of gimbals, each comprising a weld plate surface for attachment of the gimbal to a load beam supporting arm;

a pair of compliant gimbal beams having proximal ends connected to the weld plate surface, said gimbal beams being placed symmetrically and substantially parallel to a longitudinal centerline of the gimbal;

a lateral beam connected to distal ends of the gimbal beams, said lateral beam being substantially normal to the longitudinal centerline of the gimbal; and a slider supporting surface placed between the gimbal beams and connected to the lateral beam through a transition zone; and (b) a carrier strip structure substantially normal to longitudinal centerlines of the gimbals, comprising a pair of attachment tabs integral with said weld plate surface of each gimbal and proximally connecting the gimbal to the carrier strip structure; and a tooling alignment hole corresponding to each gimbal at least partially located in the carrier strip structure for engagement of a corresponding tooling hole in a load beam during manufacture of said head assemblies for disk drives.

25. A carrier-strip gimbal assembly as claimed in claim 24, wherein said tooling alignment hole corresponding to each gimbal is substantially circular in shape.

\* \* \* \* \*